United States Patent Office 3,489,261
Patented Jan. 13, 1970

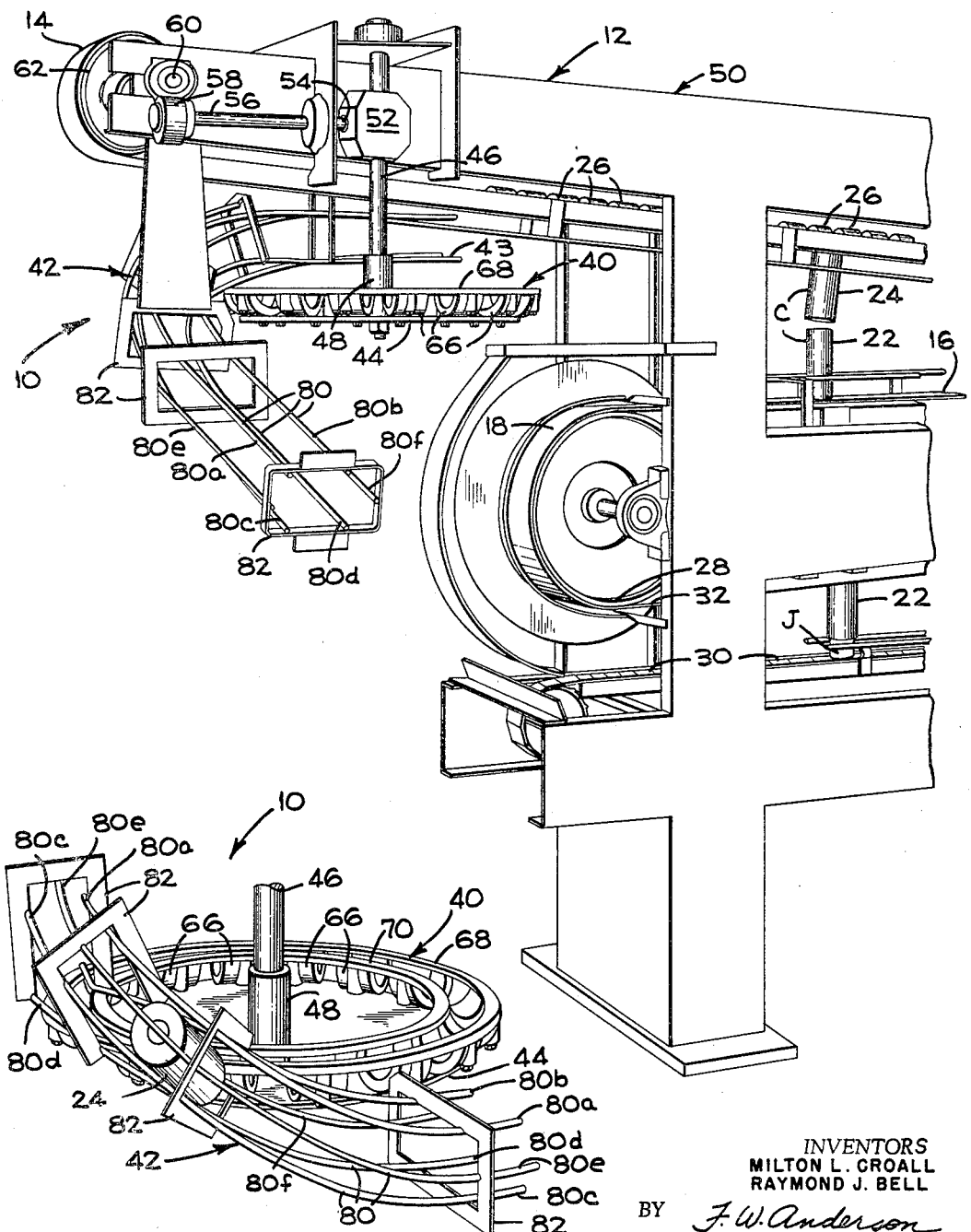

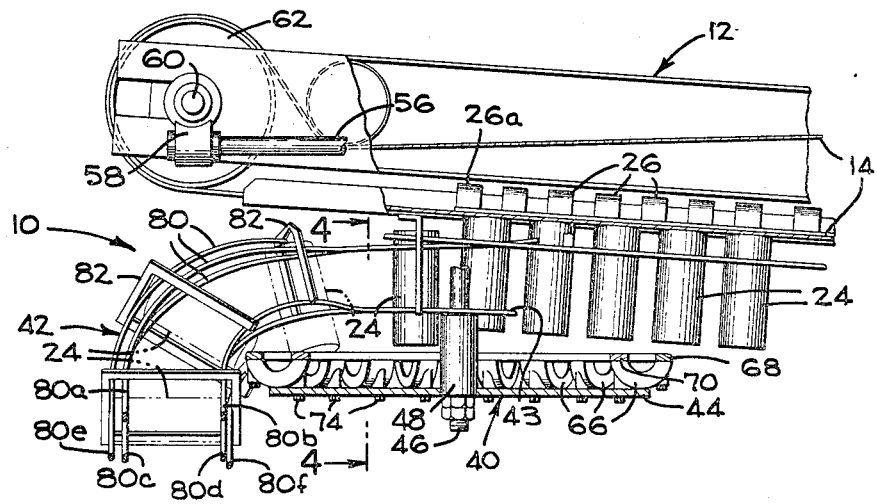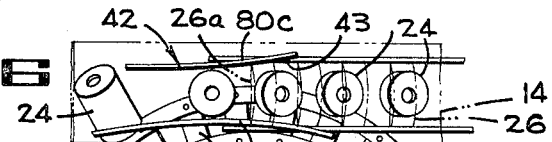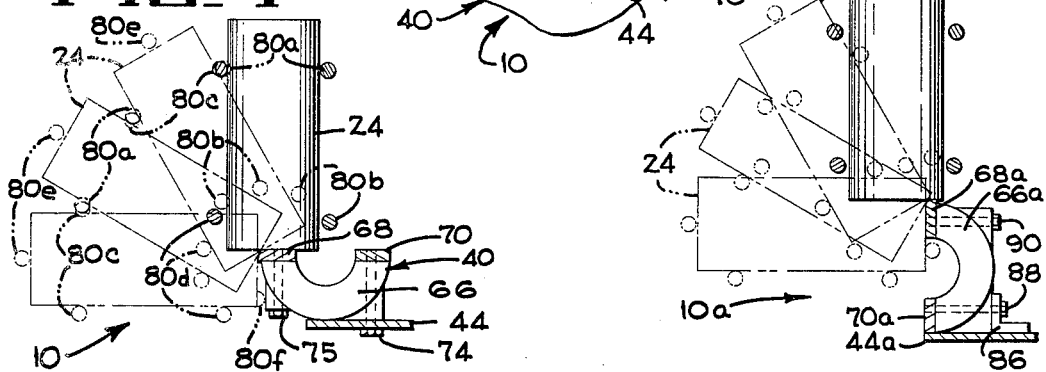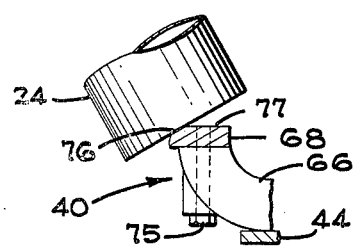

3,489,261
MAGNETIC TRANSFER APPARATUS
Milton L. Croall, Los Gatos, and Raymond J. Bell, San Jose, Calif., assignors to FMC Corporation, San Jose, Calif., a corporation of Delaware
Filed Oct. 2, 1967, Ser. No. 672,242
Int. Cl. B65g 47/52
U.S. Cl. 198—25
14 Claims

ABSTRACT OF THE DISCLOSURE

A magnetic transfer apparatus which includes a magnetic rotating disc and a container guideway that cooperate to magnetically grip spaced containers and pivot or tilt the containers between vertical and horizontal positions while maintaining the containers spaced from each other and positively moving the containers arcuately about the axis of the disc. A rounded peripheral edge of the magnetic disc permits substantially free pivotal movement of the containers in planes radial of the disc between vertical and horizontal positions yet firmly clamps the containers to the periphery of the disc for movement therewith about the axis of the disc and until stripped therefrom by the guideway.

CROSS-REFERENCE TO RELATED PATENT

The subject magnetic transfer apparatus is designed for use in the type of capsule unloader disclosed in U.S. Patent No. 3,314,560 which issued to Raymond J. Bell on Apr. 18, 1967.

BACKGROUND OF THE INVENTION

This invention pertains to an improved apparatus for transferring ferromagnetic containers from a first conveyor to a second conveyor and at the same time shifting the containers between a vertical and a horizontal position while retaining the spacing of the containers and while moving the containers along an arcuate path.

In one method of sterilizing commodities in glass jars, the jars are confined in two-piece capsules each of which includes a cartridge and a carrier that are telescope together and over the confined jar. The apparatus disclosed in the above mentioned Bell patent magnetically separates the carriers from the cartridges and jars by magnetically attaching the carriers to a continuously moving magnetic conveyor which lifts the carriers off the cartridges. The cartridges are then inverted and are gripped by another continuously moving magnetic conveyor which lifts the cartridges free of the jars. The carriers and cartridges are then released and allowed to gravitate through separate guideways, which guideways shift the released carriers and cartridges from vertical to horizontal positions and return them to a starting position for reloading and recycling through the sterilizer.

Since the cartridges and carriers were gravitationally advanced, as opposed to being positively driven, through their respective guideways after being released from the associated magnetic conveyors, the cartridges and carriers would too frequently tend to jam in the guideways. Such jams caused excessive frictional wear and bending of the open ends of the cartridges and carriers thereby presenting a replacement problem and also required the attention of an operator to assure continuous movement of the cartridges and carriers through the associated guideways.

SUMMARY OF THE INVENTION

The improved magnetic transfer apparatus of the present invention includes a magnetic disc which magnetically attracts or grips the open ends of the spaced cartridges and carriers, which cartridges and carriers may be generically referred to as containers, immediately after the containers have been released by the magnetic conveyor. The disc then positively advances the gripped containers through the associated guideways, which guideways tilt each container from a vertical to a horizontal position as the containers are moved arcuately about the axis of the disc. Since the spaced containers are magnetically attracted to the periphery of the disc, they retain their initial spacing and are positively advanced through the guideways thus preventing container jams therein. A rounded peripheral edge of the disc permits the containers to freely pivot in planes that extend radially of the axis of the disc yet prevents movement of the container relative to the disc in a direction longitudinally thereof. Therefore, the angular velocity of the containers is the same as the angular velocity of the disc. After the containers have been moved through an arc of about 90° and have been pivoted from the vertical to the horizontal position, they are stripped from the disc by a portion of the guideway.

BRIEF DESCRIPTION OF THE DRAWINGS

FIGURE 1 is a perspective of one end of a capsule unloader illustrating the magnetic transfer apparatus of the present invention.

FIGURE 2 is a perspective of the disc and a portion of the guideway.

FIGURE 3 is an enlarged side elevation with certain parts being shown in vertical section in planes parallel to the longitudinal axis of the capsule unloader, certain container being omitted in the guideway for clarity.

FIGURE 4 is an enlarged diagrammatic operational view in vertical section taken substantially along lines 4—4 of FIGURE 3 illustrating several operative positions of the containers within the guideway.

FIGURE 5 is an enlarged fragmentary section of the magnetic disc illustrating a curved surface of the outer magnetic ring.

FIGURE 6 is a fragmentary plan looking down upon the containers at the point of tangency between the magnetic feed conveyor and the disc, the magnetic conveyor being shown in phantom.

FIGURE 7 is an enlarged vertical section similar to FIGURE 4 of a modified form of the magnetic transfer apparatus.

DESCRIPTION OF PREFERRED EMBODIMENT

The improved magnetic transfer apparatus 10 (FIGS. 1 to 6) of the present invention is associated with a capsule unloader 12 which includes a continuously driven carrier conveyor 14 which is inclined upwardly from the upper run 16 of a continuously driven capsule conveyor 18. A plurality of ferromagnetic capsules C, each of which includes a cartridge 22 telescoped within a carrier 24, are fed onto the inlet end of the capsule conveyor 18 and have jars J or other types of rupturable hermetically sealed containers therein. A series of magnets 26 are placed above the lower run of the carrier conveyor 14 and cause the carriers 24 to magnetically cling to the conveyor 14 and be moved thereby to the transfer apparatus 10. The cartridges 22 with the jars J therein are inverted about a magnetic drum 28 so that the jars will gravitate therefrom onto a continuously driven jar conveyor 30 for discharge from the unloader 12 while the cartridges 22 are attracted to the lower run 32 of the capsule conveyor 18 by magnets (not shown) supported thereabove. The cartridges 22 are advanced by the lower run 32 of conveyor 18 into another magnetic transfer apparatus (not shown) which is substantially the same as the apparatus 10.

The magnetic transfer apparatus 10 includes a magnetic rotating disc 40 and a container guideway 42. The magnetic rotating disc has its outer peripheral supporting surface tangent to the path of movement of the containers on the conveyor 14 at a point below the terminal magnet 26a (FIGS. 3 and 6) so as to receive and support the containers immediately after they have been released from the conveyor 14. The input end 43 of the guideway 42 also projects inwardly of the discharge end of the container 14 slightly past the point of tangency so that the containers will be guided thereby immediately after they are released from the conveyor 14.

The magnetic rotating disc 40 comprises a circular horizontally disposed support plate 44 of non-magnetic material which is rigidly secured to the lower end of a vertical driveshaft 46 by a hub 48 and cooperating locknuts. The drive shaft 46 (FIG. 1) is journaled on the frame 50 of the unloader 12 and is drivingly connected to a right angle gear box 52. The input shaft 54 of the gear box 52 is coupled to one end of a shaft 56 having its other end coupled to the output of the gearbox 58. The input of the gearbox 58 is drivingly connected to a shaft 60 which supports the driven pulley 62 of the carrier conveyor 14 as illustrated in FIGURES 1 and 3. The gear ratio of the gear boxes 52 and 58 are preferably arranged to drive the periphery of the magnetic disc 40 at the same linear speed as the speed of the carrier conveyor 14 thereby maintaining the same spacing between the carriers 24 during movement by the conveyor 14 and transfer by the disc 40. If it is desired to change the carrier spacing during transfer, it will be understood that the carrier spacing may be increased or decreased by selecting gear ratios which drive the container supporting periphery of the disc 40 at speeds which are faster or slower, respectively, than the linear speed of the conveyor 14.

A plurality of equally spaced permanent magnets 66 are disposed concentrically about the driveshaft 46 and have their common poles, for example, their north poles, disposed radially outward of the shaft 46 and bolted to an outer or container supporting magnetic ring 68. The magnetic ring 68 grips the containers with sufficient force to prevent relative rotational movement between the disc 40 and the containers about the axis of the disc 40. All of the inner poles of the magnets 66 are likewise connected to an inner magnetic ring 70 and to the support plate 44. As indicated in FIGURE 4, the magnets 66 and the inner ring 70 are connected by capscrew 74 to the non-magnetic supporting plate 44. The outer ring 68 is connected to the magnet 66 by capscrew 75.

An important feature of the invention is that the outer peripheral edge 76 (FIG. 5) of the outer magnetic ring 68 is rounded thus providing very little if any magnetic resistance to tilting movement of the containers in planes that extend radially of the magnetic disc 40 after the lower edge of the container has been pivoted sufficiently to move off the flat upper surface 77 of the outer ring 68.

The container guideway 42 is provided for guiding the containers from vertical to horizontal positions while being positively advanced therethrough by the magnetic rotating disc 40 and for thereafter stripping the containers from the magnetic disc 40. The container guideway 42 comprises a plurality of guide rods 80 which are connected to spaced brackets 82 supported by the unloader frame 50 so as to define a container accommodating passageway therein. Guide rods 80a, 80b, 80c, and 80d contact the sides of the containers, extend the full length of the guideway 42, and have their inlet ends disposed in guiding relation with the containers as the containers are moved past the terminal magnet 26a (FIGS. 3 and 6) at the discharge end of the carrier conveyor 14. Guide rod 80e has its inlet end adjacent the discharge end of the conveyor 14 and guides the substantially closed or upper end of the containers. Guide rod 80f engages the open or lower end of the containers after the containers have been moved to their horizontal positions and also strips the containers from the magnetic disc 40.

As indicated in FIGURE 4, the portion of the guide rod 80f which strips each container from the disc is preferably spaced from the central longitudinal axis of the container and is located near the lower peripheral surface of the open end of each container moving therepast so as to slidably engage a relatively long arcuate edge of each container rather than engaging two diametrically spaced, relatively weak surfaces of the containers during the stripping operation.

The alternate form of the magnetic transfer apparatus 10a (FIG. 7) is substantially the same as the apparatus 10 (FIGS. 1–5) except that the magnets 66a are mounted on their sides rather than on their bight sections as in the first embodiment of the invention. The magnets 66a are connected to an angle member 86 that is rigid with the non-magnetic support plate 44a and to the magnetic ring 70a by capscrews 88. The containers supporting magnetic ring 68a is concentric with and of the same diameter as the magnetic ring 70a and is connected to the associated magnetic poles by capscrews 90.

Since the operation of both forms of the invention are substantially the same, only the operation of the first embodiment of the invention will be described. The conveyors 14, 18 and 30 (FIG. 1) of the capsule unloader are continuously driven by a drive train fully disclosed in the aforementioned Bell patent. The magnetic rotating disc 40 is continuously driven from the shaft 60 by the gear boxes 52 and 58 and associated shafts. Magnets 26 disposed above the lower run of conveyor 14 attracts the carriers 24 thereto and moves them in spaced relation toward the magnetic transfer apparatus 10 of the present invention. As the carriers 24, hereinafter termed containers, are moved past the terminal magnet 26a and moved within the inlet end 43 of the guideway 42, the containers fall onto the magnetic container supporting ring 68 of the magnetic disc 40 and are immediately magnetically attracted thereto assuring that they will be positively driven through the guideway 42 at an angular velocity equal to that of the rotating disc 40. As the containers move through the guideway 42 they are held in spaced relation and are easily tilted about the curved peripheral edge 76 (FIG. 5) of the container supporting ring 68 from a vertical to a horizontal position. Upon reaching the horizontal position, the guide rod 80f (FIG. 4) engages the lower arcuate edge of the open ends of the containers and strips them free of the magnetic rotation disc 40 allowing the containers with their longitudinal axes disposed horizontally to gravitate out the lower end of the guideway 42.

From the foregoing description it will be apparent that the magnetic transfer apparatus of the present invention magnetically grips and positively drives the spaced containers through a guideway which pivots the containers between a vertical and a horizontal position. A rounded edge of the magnetic disc aids in assuring ease in pivotal movement of the containers thereby minimizing container wear and damage during transfer.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, we claim:

1. An apparatus for transferring ferromagnetic containers comprising magnetic means having a circular peripheral edge for magnetically gripping the containers at a transfer station and moving them along an arcuate path, conveying means for delivering the containers to said magnetic gripping means at said transfer station, said magnetic gripping means being driven and having said circular peripheral edge tangent to said conveying means at said transfer station, guide means for effecting tilting movement of the containers through approximately 90° in a radial plane normal to the plane of said path and while the containers are attracted to said magnetic gripping means, and means for releasing the containers from said magnetic gripping means, the containers being magnetically attached to said peripheral edge, which edge is curved in radial cross section to aid in unrestricted tilting movement of the containers during movement through said guide means.

2. An apparatus according to claim 1 wherein said conveying means is driven and the containers moved by said conveying means are spaced a predetermined distance apart, and wherein the peripheral edge of said rotary magnetic means is driven at a tangential speed which is substantially equal to the speed of said conveying means thereby maintaining said predetermined spacing of the containers while the containers are magnetically attached to said peripheral edge.

3. An apparatus according to claim 2 wherein said conveying means is a continuously driven endless conveyor which includes a moving belt and second magnetic means adjacent said belt for attracting the containers to said belt, and wherein said second magnetic means terminates immediately adjacent said transfer station.

4. An apparatus according to claim 1 wherein said containers are elongated cylindrical containers having an axis of generation and having one end open, wherein said guide means includes a plurality of spaced rods which define an elongated path with side edges spaced apart a distance slightly larger than the diameter of said containers, and wherein said releasing means is one of said rods which is disposed in position to engage said open ends of the containers adjacent one of said side edges of said enclosed path.

5. An apparatus according to claim 1 wherein said driven magnetic gripping means includes a plurality of equally spaced permanent magnets having common poles arranged in concentric circles, and wherein spaced magnetic rings are secured to associated ones of said poles.

6. An apparatus according to claim 5 wherein said concentric circles are of different diameters, wherein said spaced magnetic rings include an inner ring secured to the common poles in the inner circle and an outer ring secured to the common poles in the outer circle, and wherein said peripheral edge is circular and is formed on said outer magnetic ring.

7. An apparatus according to claim 5 wherein said concentric circles and spaced magnetic rings are of the same diameter, and wherein said peripheral edge is formed on one of the magnetic rings.

8. An apparatus according to claim 1 wherein said conveying means is a continuously driven endless conveyor which includes a moving belt and second magnetic means adjacent said belt for attracting the containers to said belt and wherein said second magnetic means terminates immediately adjacent said transfer station.

9. A method of transferring ferromagnetic elongated articles comprising the steps of moving the articles at evenly spaced intervals and at a predetermined speed along a linear path, releasing the articles at a transfer station, magneticlly gripping the spaced articles at said transfer station and moving the articles along an arcuate path that is tangent to said linear path at said transfer station, tilting the articles substantially 90° in a plane normal to the arcuate plane of travel of said articles while magnetically gripped and moved along said arcuate path, and stripping the tilted articles from said arcuate path.

10. A method according to claim 9 wherein said magnetically gripped articles are moved along said arcuate path at a speed substantially equal to said predetermined speed for maintaining the articles spaced apart.

11. A method according to claim 9 wherein the articles are magnetically gripped while moving along said linear path.

12. An apparatus for transferring spaced ferromagnetic containers comprising a driven endless feed conveyor having a lower run, magnetic means disposed above a portion of the lower run of said feed conveyor for attracting and supporting spaced containers by their upper ends against said lower run for advancement along a linear path and release at a teransfer station, a driven magnetic disc having a circular periphery disposed tangent to and below the path of movement of the containers on said feed conveyor in position to receive and magnetically attract the lower ends of the containers immediately after they are released at said transfer station by said feed conveyor, said magnetic disc being arranged to move the containers around an arcuate path, and guide means on both sides of said linear and arcuate path extending both upstream and downstream from said transfer station, said guide means including a helically twisted portion adjacent said magnetic disc for tilting the containers substantially 90° in a radial plane normal to and radially of the plane of said disc and while they are magnetically attracted to said magnetic disc.

13. An apparatus for transferring singulated ferromagnetic containers comprising rotatable magnetic means having an axis of rotation and a continuous annular gripping periphery lying in a reference plane for magnetically gripping the singulated containers, means for moving said containers along a predetermined arcuate path while being gripped by said magnetic means, guide means for effecting tilting movement of said containers in a radial plane normal to said reference plane and having said axis of rotation therein, said tilting movement occurring while said containers are attached to said magnetic gripping means, and means for releasing said containers from said magnetic gripping means, said annular gripping periphery being curved in radial cross-section to minimize the forces required to tilt the containers when moving along said arcuate path.

14. The apparatus of claim 13 in which said singulated containers are positively held by a conveying and feeding means, said container being gripped by said magnetic means immediately after release from said conveying means.

References Cited

UNITED STATES PATENTS

| | | | |
|---|---|---|---|
| 2,862,601 | 12/1958 | Littwin | 198—41 |
| 3,153,471 | 10/1964 | Arnett | 198—41 |
| 3,338,374 | 8/1967 | Dudley | 198—41 |

RICHARD E. AEGERTER, Primary Examiner

U.S. Cl. X.R,

198—41